United States Patent [19]

Nicklas et al.

[11] Patent Number: 4,694,626
[45] Date of Patent: Sep. 22, 1987

[54] INSULATING BOARD

[75] Inventors: Hans Nicklas, Darmstadt; Christoph Pruzina, Walluf, both of Fed. Rep. of Germany

[73] Assignee: ISPO Gmbh, Kritel, Fed. Rep. of Germany

[21] Appl. No.: 888,549

[22] Filed: Jul. 18, 1986

[30] Foreign Application Priority Data

Jul. 26, 1985 [DE] Fed. Rep. of Germany ....... 3526715

[51] Int. Cl.⁴ .................. E04C 2/10; E04C 2/26
[52] U.S. Cl. ..................... 52/309.12; 52/448
[58] Field of Search ............ 52/309.12, 402, 446, 52/309.4, 448, 594, 590

[56] References Cited

U.S. PATENT DOCUMENTS

| 1,532,874 | 4/1925 | Broady | 52/448 |
| 2,278,077 | 3/1942 | Jockisch | 52/448 |
| 3,638,381 | 2/1972 | Robertson | 52/309.12 |
| 3,657,852 | 4/1972 | Worthington | 52/594 |
| 4,044,520 | 8/1977 | Barrows | 52/309.12 |
| 4,426,818 | 1/1984 | Hoffmann | 52/309.4 |
| 4,439,967 | 4/1984 | Dielenberg | 52/309.12 |

FOREIGN PATENT DOCUMENTS

| 0015564 | 9/1980 | European Pat. Off. . |
| 0056660 | 7/1982 | European Pat. Off. . |
| 426251 | 4/1924 | Fed. Rep. of Germany ........ 52/594 |
| 1658875 | 9/1971 | Fed. Rep. of Germany . |
| 2653991 | 6/1978 | Fed. Rep. of Germany ........ 52/590 |

Primary Examiner—John E. Murtagh
Attorney, Agent, or Firm—Sprung Horn Kramer & Woods

[57] ABSTRACT

An insulating board of plastic foam provided on at least one edge with beaver-tail-shaped tabs that completely complement similar tabs of another board when the boards are placed alongside one another. Such boards are assembled side-by-side to make up a facade which is then plastered. The interlock prevents gaps at the joints and eliminates the need for fabric reinforcement.

15 Claims, 2 Drawing Figures

INSULATING BOARD

BACKGROUND OF THE INVENTION

Single-layer complete heat-insulation systems for the exterior insulation of the walls of buildings are known. They consist of insulating boards of rigid expanded plastic, polystyrene in particular, cemented to the outer surface of the building with a mortar preparation or composition and provided with a coating of dispersion plaster. The material-specific shrinkage of expanded-plastic boards and the effects of temperature and weather result in considerable stress in the exterior insulation-composition system, especially between the boards and the plaster coating, which can lead to the plaster shearing off and to cracks in the coating, especially where the boards abut one another, even though a woven reinforcement is usually embedded in the outer plaster to prevent cracking. Providing at least the outside of the plastic boards with assemblages of longitudinal and transverse incisions deeper than half the thickness of the board is known (EPA No. 0 015 564) is known. This is intended to prevent stress peaks at the joints between the boards and to extensively eliminate cracks in the coating. To improve the adhesion of the mortar preparation and especially of the undercoat to the board, one or both surfaces are provided with dove-tailed grooves. Although the boards usually have a rectangular cross-section with the abutting edges perpendicular to the surface, surrounding them with an interlocking rabbet is also known (German AS No. 1 658 875).

Since the known anti-cracking measures, which relate to the plastic itself and to its preliminary treatment—to adequate aging and to preparation of the outside and inside surfaces and on occasion of the abutting edges for example—are not absolutely reliable, it is still necessary to reinforce the plaster or other coating with a woven fabric.

SUMMARY OF THE INVENTION

The object of the present invention is to provide a means of interlocking adjacent insulation boards as they are applied to a flat surface in such a way that any changes in dimension occasioned by shrinkage, contraction, or temperature, will not result in gaps at the joints to the extent that the plaster will no longer need to be reinforced with a woven fabric.

This object is attained in accordance with the invention in an insulation board made out of rigid expanded plastic characterized by essentially beaver-tail-shaped interlocking tabs at the abutting edges.

Some preferred embodiments of the invention will now be described with reference to the accompanying drawings, wherein

DETAILED DESCRIPTION OF THE PREFERRED EMBODIMENTS

Figure 1:
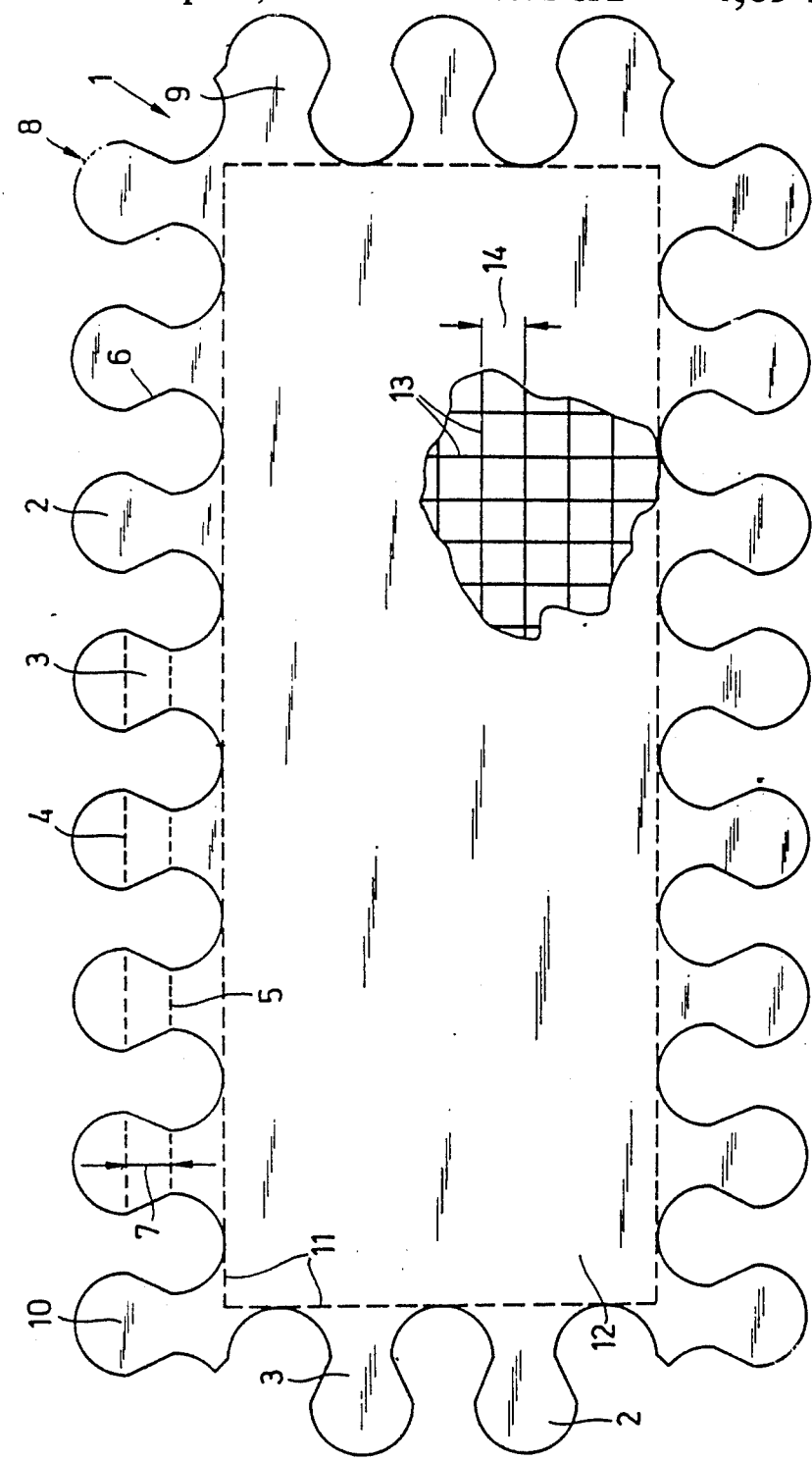
FIG. 1 is an approximately ¼-scale face-on view of an insulation board in accordance with the invention and FIG. 2 is an approximately actual-scale face-on view of some tabs.
Figure 2:
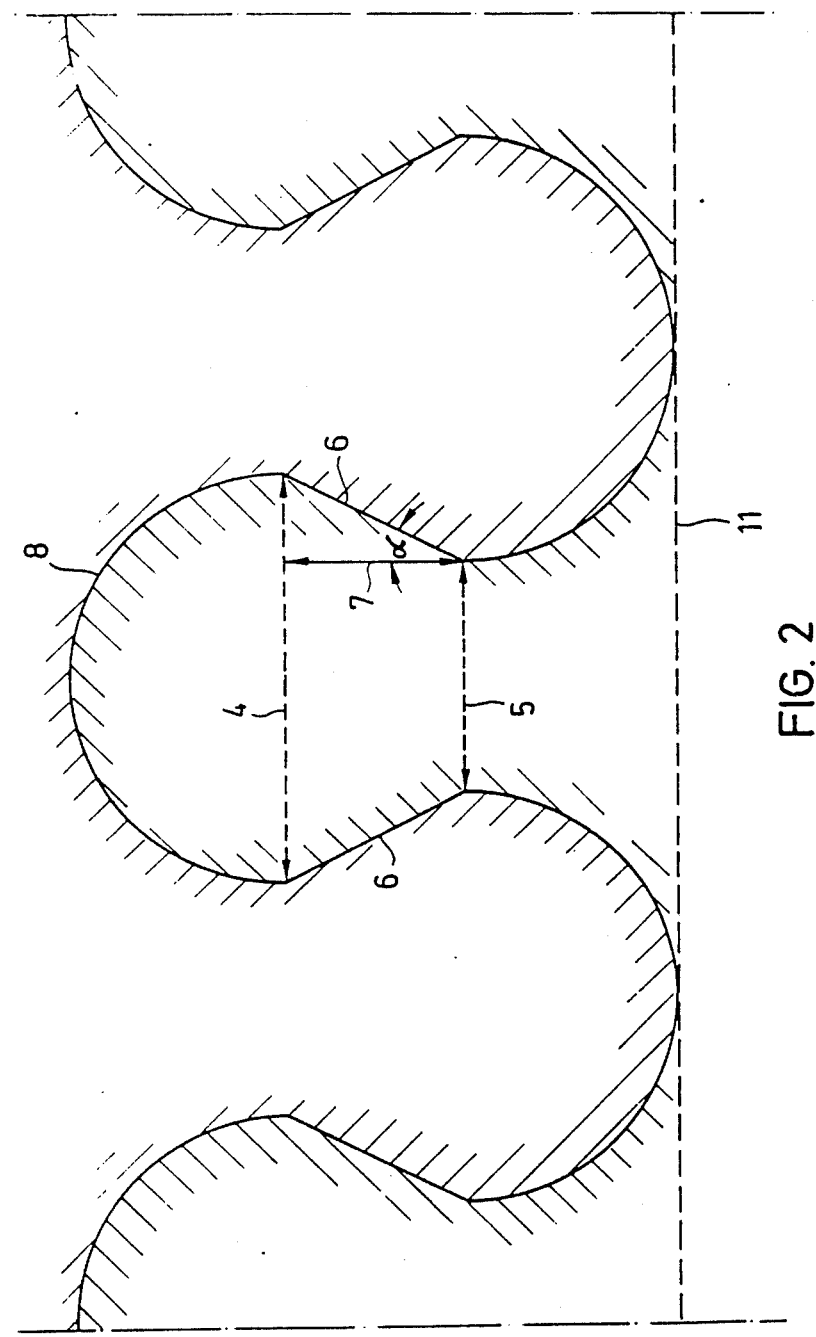

An insulating board 1 is made out of plastic foam, preferably rigid expanded polystyrene, in accordance with DIN 18164. Because of its specific shape the piece is preferably expansion molded to standard dimensions (modular).

The surfaces of the board, which are either to be fastened to the surface being insulated or covered with plaster or other type of coating, are conventionally parallel. The board is, as is conventional, 30 to 150 and especially 40 to 80 mm thick. The abutting edges of the boards are preferably perpendicular to the surfaces. The edges of the board, however, are not conventionally straight, but are provided with beaver-tail-shaped tabs 2 that completely interlock at the joints when the boards are mounted. Each tab shape is comprised of a trapezoidal area 3 with an axially symmetrical curve 8 of the second order resting against its longer parallel side 4, which constitutes the widest section of tab 2, and with a curve extending from the shorter parallel side 5 of the conceptual trapezoid, which constitutes the narrowest section of the tab, to the line 11 demarcating the conceptual straight-sided main area 12 of the board. The overall geometry of the tabs ensures that each tab will fit precisely into the space between two other adjacent tabs on an abutting board, so that the zone between the main areas of the boards will be completely filled up.

The curve 8 of the second order is preferably an arc of a circle, ellipse, parabola, or hyperbola. The curved abutting edge of each tab 2 is at least 1.1 times as long as the longer parallel side 4 of the trapezoidal area 3. Thus, the arc or segment of a curve 8 of the second order that extends from one end of the longer parallel side 4 of trapezoidal area 3 to the other constitutes a segment of a circle or a symmetrial section of an ellipse adjoining the trapezoid. The area that constitutes this part of beaver-tail-shaped tab 2 can, however, also be demarcated by a parabola or by the branch of a hyperbola. The function of curve 8, which merges into the non-parallel sides 6 of the trapezoidal area 3 of tab 2, is to tangentially distribute and hence dissipate stress along its top camber. The curvature also prevents gaps in the joints between two adjacent boards.

The actual interlocking between the abutting edges of the boards derives from the non-parallel sides 6 of trapezoidal area 3. Any angle of more than 0° and less than 90° in relation to the axis of the tab or to the height 7 of trapezoidal area 3 will result in interlocking (e.g. parallelogram).

The particular dimensions of the trapezoid will ensure that each tab 2 remains dimensionally stable when that board is installed and that the interlocking action will be maintained no matter what stresses occur. For this reason the widest section of tab 2, the longer parallel side 4 of trapezoidal area 3 that is, is at least 1.2 times as long as the board is thick.

The longer parallel side 4 of trapezoidal area 3 will in particular be 1.2 to 2.5 times as long as the board is thick. Thus, if the board is 100 mm thick for example, side 4 will be 120 to 250 mm long.

The shorter parallel side 5 of trapezoidal area 3 will be at least 0.8 times as long as the board is thick. To ensure satisfactory interlocking, however, shorter parallel side 5 will be no more than 0.9 times as long as longer parallel side 4.

The height 7 of trapezoidal area 3 will be at least half the thickness of the board.

To ensure adequate longitudinal and transverse stability of the tabs that divert the stresses, the otherwise conventionally rectangular or square insulating board should be dimensioned in such a way that every abutting edge has at least two completely included beavertail-shaped tabs 2, as illustrated in FIG. 1 for a standard board with overall dimensions of 100×50 cm.

The tabs are unnecessary at the corners of buildings, at embrasures, etc., where trimming boards with a straight edge or boards that have simply been cut to the local conditions can be employed.

The beaver-tail-shaped tabs on the boards should be stubbed to the peripheral zones in such a way that the boards will completely occupy the total space when mounted. The geometry of the tabs 9 and 10 at the corners is accordingly designed to ensure complete coverage.

The total area of all beaver-tail-shaped tabs 2, the area outside of conceptual demarcating line 11 that is, should equal ½ to 1/20 and preferably ⅓ to ⅛ of the main rectangular area 12 enclosed by line 11 to ensure the interlocking and stress-diverting action of the tabs and to make the boards easy to handle.

The boards have in a practical way, at least at the surface that is to be plastered, and perpendicular thereto, assemblages of longitudinal and transverse incisions deeper than ½ the distance between them, as known from EPA No. 0 015 564 and EPA No. 0 056 660. The incisions, each of which parallels a line 11, particularly longitudinally and transversely, are 10 to 250 and preferably 10 to 120 μm wide. The particular width depends on the composition of the mortar in such a way as to prevent any excess or filler on the part of the plaster or coating with particles larger than 0.25 mm from penetrating into the incisions to the detriment of their function of accommodating any stresses that occur at the surface of the board and of dissipating them toward the interior.

The surface of the board can if desired also be provided with grooves for the mortar to penetrate into. The grooves can also be undercut. The boards can also be rabbeted at the edge without departing from the scope of the invention.

FIG. 1 illustrates one embodiment of the invention by way of example at about ¼ scale. The figure shows an expansion-molded insulation board of rigid polystyrene of the type specified in DIN 1864, about 50 mm thick and with overall dimensions of 1000×500 mm, the area enclosed by line 11 measuring 796×296 mm. The base line of the tabs in this case is about ⅓ of the main area demarcated by line 11. Each tab is about 72 mm wide at its widest section, the longer parallel side 4 of trapezoidal area 3. The narrowest section, the shorter parallel side 5, is 40 mm wide. The height 7 of the trapezoid is 30 mm. The curve 8 of the second order that rests on the longer parallel side of the trapezoid in this case is a circle with a radius of 36 mm. Thus, the area of the tab surrounded by this curve is a segment of a circle.

It is understood that the specification and examples are illustrative but not limitative of the present invention and that other embodiments within the spirit and scope of the invention will suggest themselves to those skilled in the art.

We claim:

1. An insulating board of plastic foam provided on at least one edge with beaver-tail-shaped tabs that completely complement similar tabs of another board when the boards are placed alongside one another, each beaver-tail-shaped tab being geometrically in the form of a trapezoidal area with, adjacent its longer parallel side, an area demarcated by an axially symmetrical curve of the second order about 1.1 times as that side, the height of the trapezoidal area equalling at least ½ the thickness of the board.

2. An insulating board according to claim 1, wherein the longer parallel side of the trapezoidal area is about 1.2 to 2.5 times as long as the board is thick.

3. An insulating board according to claim 1, wherein the shorter parallel side of the trapezoidal area is at least 0.8 times as long as the board is thick and no more than 0.9 times as long as the longer parallel side.

4. An insulating board according to claims 1, wherein the abutting edge of the board has at least two completely included beaver-tail-shaped tabs.

5. An insulating board according to claim 1, wherein the axially symmetrical curve of the second order that extends over the longer parallel side of the trapezoidal area is an arc of a circle, of an ellipse, of a parabola, or of a branch of a hyperbola.

6. An insulating board according to claims 1, including beaver-tail-shaped tabs at the corners which are likewise designed to completely complement one another when two such boards are placed together.

7. An insulating board according to claims 1, wherein the total area of the tabs equals about ½ to 1/20 of the main rectangular area of the board.

8. An insulating board according to claims 1, wherein the total area of the tabs equals about ½ to ⅝ of the main rectangular area of the board.

9. An insulating board according to claims 1, wherein the abutting edges of the beaver-tail-shaped tabs are at an angle of 90° to the surface of the board.

10. An insulating board according to claims 1, wherein at least at the surface that is to be plastered, and perpendicular thereto, the board is provided with assemblages of longitudinal and transverse incisions deeper than ½ the distance between them.

11. An insulating board according to claim 10, wherein each incision is 10 to 250 μm wide.

12. An insulating board according to claim 10, wherein each incision is 10 to 120 μm wide.

13. An insulating board according to claim 1, which has been produced by expansion molding.

14. An insulating board according to claim 1, formed of rigid expanded polystyrene.

15. An insulated facade made up of assembled insulated boards according to claim 1 carrying a coat of plaster.

* * * * *